May 14, 1940.  A. W. RUFF  2,200,302

REFRIGERATION

Filed May 9, 1938

Inventor
Alonzo W. Ruff
By
Dodge and Son
Attorneys

Patented May 14, 1940

2,200,302

UNITED STATES PATENT OFFICE 2,200,302

REFRIGERATION

Alonzo W. Ruff, York, Pa., assignor to York Ice Machinery Corporation, York, Pa., a corporation of Delaware Application May 9, 1938, Serial No. 206,881

2 Claims. (Cl. 62—129)

This invention relates to air conditioning and particularly, though not exclusively, to unit room coolers, usually comprising a mechanical cooling device with air cooled condenser arranged to be cooled by an air stream drawn in from out-of-doors and discharged out-of-doors through a window board or the like.

The cooling element or evaporator forming part of the refrigerant circuit exchanges heat with air delivered to the room, and drawn in whole or in part from the room. A prime problem with such devices has been disposal of drip water, i. e. water condensing from the cooled air and dripping from the evaporator.

Nearly all commercial unit coolers seek to re-evaporate this water in the condenser cooling air stream in one way or another. Most of these prior art schemes treat this potentially useful drip water as a nuisance, and by using it merely for condenser cooling fail to secure from it the maximum available cooling effect.

The purpose of the present invention is to use the drip water to secure a substantial increase in the efficiency of the refrigerative circuit by sub-cooling the condensed refrigerant.

To do so the condenser is caused to deliver liquefied refrigerant to a liquid cooling unit mounted in the condenser fan housing, through a liquid seal trap. This trap prevents the entrance of uncondensed refrigerant so that effective sub-cooling of the liquid below the temperature in the condenser is made possible. The drip water is delivered to the fan rotor, which atomizes it in the air blast surrounding the rotor, so that there is an intense evaporative effect and substantial sub-cooling of the liquid below the temperature at which it was condensed in the condenser.

As a result of the arrangement just described, the cooling effect of the drip water is concentrated on the sub-cooler. This should be distinguished clearly from prior efforts at sub-cooling in which a coil or receiver was merely submerged in the drip water or cooling water, the cooling water being used as a spray on the condenser proper. It is characteristic of the present device that practically all the drip water is evaporated as a spray on the sub-cooler and little or none of the drip water is used directly on the condenser.

The resulting increase in overall efficiency is particularly important in the small compact mechanical refrigerating units required for this class of service.

Since the mechanical structure of unit coolers is well known, and is not directly involved in the invention and since the mechanical aspects affecting the present invention can be fully illustrated in diagram, the invention will be illustrated in the accompanying drawing omitting such conventional features as condenser fins, evaporator fins, motor and compressor supports, dampers, switches and other accessories which would complicate the drawing and obscure the invention. These details can be arranged according to any preferred practice.

Figure 1:
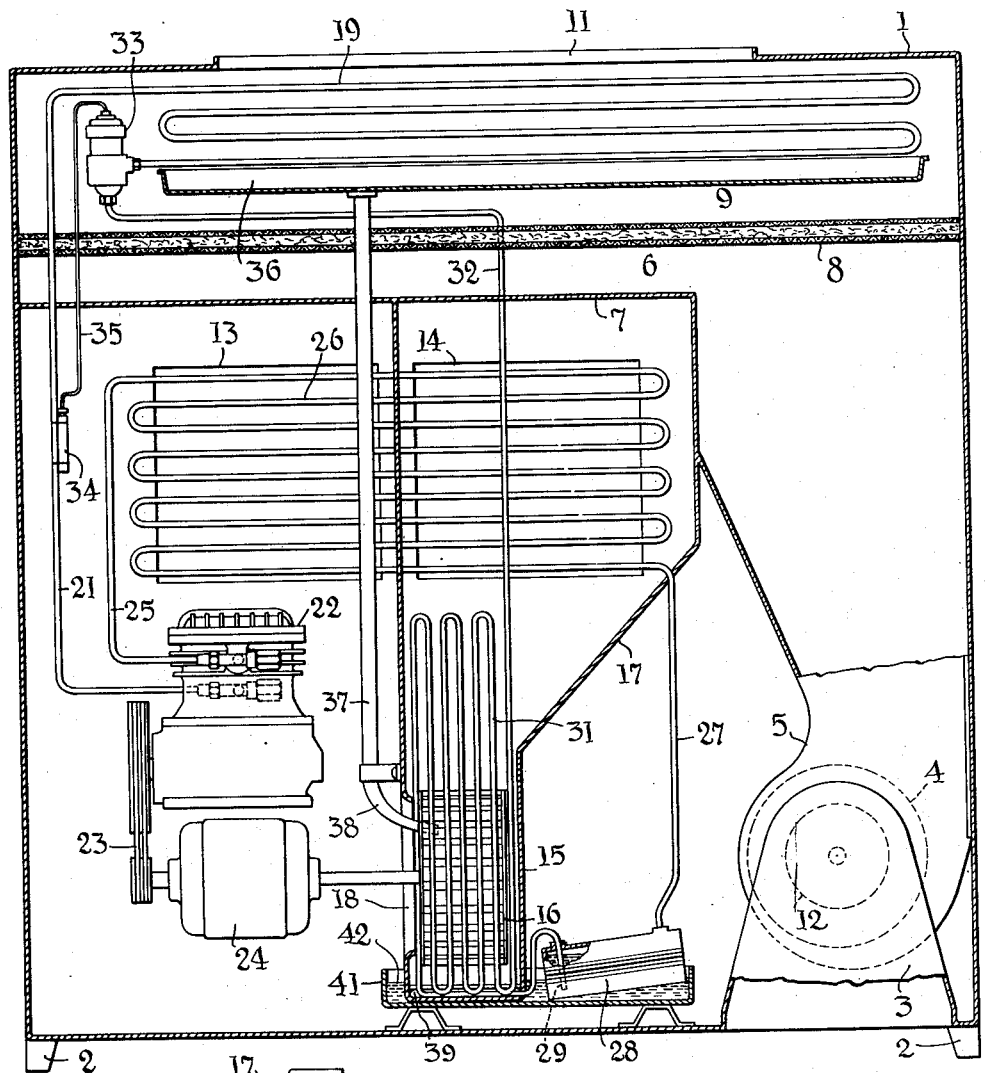
Fig. 1 is a vertical longitudinal section showing the essential components of the air cooler arranged according to the invention.

The main casing 1 rests on feet 2 which support its closed bottom above the floor. The air circuits will first be traced.

Room air enters through an opening in the bottom of casing 1, passes through housing 3 to the eye of fan 4 in snail shell housing 5 and is delivered to plenum space 6 above partition 7 and beneath filter 8. It passes through the filter to the cooling chamber 9 and returns to the room through slot 11 in the top of casing 1. The illustrated location of filter 8 and slot 11 are chosen to simplify the diagram, rather than to show an ideal flow path, but this involves design features well understood in the art and the precise arrangement is not a feature of the present invention.

The fan 4 is driven in any suitable way, an electric motor 12 being indicated. The housings 3 and 5 and partition 7 define a room air circuit within casing 1 which is isolated from the remainder of the interior of that casing.

The rear of casing 1 has an inlet opening 13 and an outlet opening 14 for condenser cooling air, and these lead from and to a space external to the room to be cooled. The conventional practice is to connect openings such as 13 and 14 to a ported window board (not shown) so that a circuit from and back to outdoor space is afforded, but any arrangement may be used, so long as the heated condenser cooling air is discharged outside the room being cooled.

The snail shell housing 15 of the condenser air fan 16 has a flaring outlet duct 17 which leads to discharge opening 14. Thus air entering at 13 flows to the eye 18 of the fan housing 15 and is propelled by the fan 16 through duct 17 to and through discharge opening 14.

The refrigerating circuit includes an evaporator 19 mounted in space 9 and diagrammatically shown as a simple zig-zag coil. In practice a compact finned coil extensively used in the art would be preferred. From evaporator 19 the suction line 21 leads to compressor 22 shown as of the two cylinder air cooled type, driven through belts 23 by electric motor 24. Fan 16 is mounted on the shaft of motor 24. The compressor and motor are supported in housing 1 by any preferred means (not shown).

From compressor 22 discharge line 25 leads to condenser 26 shown as a simple zig-zag coil. In commercial practice a finned coil is used. As clearly indicated in the drawing, the condenser extends across both openings 13 and 14, so that part of it is cooled by entering air and part by air about to be discharged from the condenser cooling air circuit.

Figure 2:
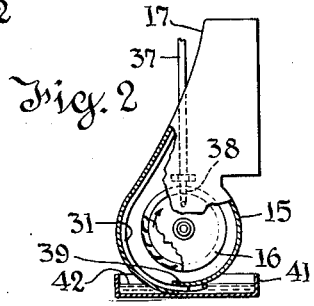
Fig. 2 is a fragmentary section transverse to the axis of the condenser fan drawn on a smaller scale than Fig. 1 and illustrating the position of the liquid refrigerant cooling coil in the fan housing.

From condenser 26 condensed refrigerant is conducted by liquid line 27 to receiver 28 from which a dip pipe 29 conducts liquid to the sub-cooling coil 31 in housing 15. Since coil 31 is a feature of the invention it is shown as actually constructed, namely, a simple zig-zag coil mounted against the inner face of housing 15 outside fan runner 16 and extending part way up the tangent wall of outlet duct 17. (See Fig. 2.)

Receiver 28 and dip pipe 29 form a liquid sealing trap so that uncondensed vapor cannot pass from condenser 26 into the sub-cooler. Hence, sub-cooling can occur in coil 31 as later explained because uncondensed vapor does not reach this coil.

From coil 31 sub-cooled liquid refrigerant is fed by line 32 and thermostatic valve 33 to evaporator 19. Valve 33 is of the superheat control type and its thermostatic bulb 34 on suction line 21 is connected by tube 35 with the valve, as usual.

A drip pan 36 beneath evaporator 19 collects water condensed from the room air and dripping from the evaporator 19. It is spaced from the sides of chamber 9 to permit air flow. Drain 37 delivers this drip to nozzle 38 which discharges within fan runner 16, so that the drip is atomized by the runner and thrown violently against coil 31, which is cooled thereby. Since the water is initially quite cold and evaporates at least in part in heat exchange relation with the coil, a marked sub-cooling of liquid refrigerant occurs as it passes through coil 31.

To provide for possible fluctuations in the quantity of drip water and to guard against undue accumulation in the fan housing 15, the housing has a slot 39 at its bottom, which slot communicates with a water retaining pan 41 in which the lower portion of the receiver 28 is also received.

Consequently in periods when the drip exceeds the evaporation rate, water accumulates in pan 41 as indicated at 42. This water as it accumulates feeds through the slot and is entrained by the air current and is repeatedly brought into contact with coil 31 until evaporated. In this way the water is used almost exclusively in sub-cooling liquid refrigerant.

While it is considered better to deliver the drip through nozzle 38 to the runner 16 and thus secure in the first instance the atomizing effect of the runner, the drip may be delivered directly to the pan 41. The arrangement shown delivers some water to the pan and the essential thing is to arrange the parts so that the water can enter the fan housing in one or another way and be evaporated in the air stream in heat exchanging relation with the coil 31. Any arrangement that will effect this result is within the broad scope of the invention.

Any atomized water which may escape evaporation adjacent coil 31 will be reevaporated adjacent the right-hand portion of condenser 26 if entrained by the discharging air. This action is not sought because the purpose is to secure the maximum cooling effect at coil 31. However, it is a safeguard against the discharge of unevaporated water through outlet 14. If or when it occurs it is useful to the extent that it improves condenser performance.

The invention above outlined differs from past practice in that the drip is used, and is used exclusively so far as practicable, for sub-cooling condensed liquid. The importance of this arises from the increased efficiency attainable by sub-cooling.

For example, with the volatile refrigerant known as "Freon 12" (trade name), compressor capacity is increased approximately ½ of 1% for each Fahrenheit degree reduction of temperature of the liquid fed to the evaporator. Since the size of the compressor is a very important factor in developing a light and compact unit, even a moderate degree of sub-cooling assumes marked importance in the unit cooling art. The use of the drip for intensive sub-cooling focuses the available cooling effect to produce a marked reduction of temperature at that point in the circuit where the greatest benefit can be attained, and offers improved performance, as compared to any prior use of the drip for incidental and actually rather feeble and diffuse cooling purposes.

The principle of the invention can be availed of by specifically different arrangements, and that illustrated, though preferred, is to be considered as exemplary and not strictly limiting. For example, the scheme of having entering air cool one part of the condenser and leaving air cool the remainder is useful because it reduces the total necessary duct area. This is not considered vital but it is considered important that at least a portion of the condenser be in the path of leaving air, to ensure evaporation of any entrained moisture droplets not evaporated by heat from the liquid cooler.

What is claimed is:

1. In a room cooler, the combination of a refrigerating circuit containing a volatile liquid refrigerant, and including an air-cooled condenser, a cooler of the surface type adapted to receive liquid condensed in said condenser, a vapor-arresting connection through which said condenser supplies liquid refrigerant to said cooler, an evaporator connected to be fed with liquid refrigerant from said cooler, and means for withdrawing vaporous refrigerant from said evaporator and delivering it at higher pressure to said condenser; means for circulating air in heat exchanging relation with said evaporator and then delivering it to said room to be cooled; means for collecting moisture condensed on said evaporator; means for spraying said moisture against said cooler; and means for circulating condenser cooling air in a path isolated from the room, first in heat exchanging relation with a portion of said condenser, then in heat exchanging relation with said cooler and with the moisture sprayed thereon and finally in heat exchanging relation with another portion of said condenser, and for discharging said air to a point external to the room being cooled.

2. In a room cooler, the combination of a rotary blower including a housing and a bladed rotor encircled thereby and arranged to draw air into the housing adjacent the axis of the rotor and deliver it outward through the rotor within the encircling wall of the housing, said blower being connected to circulate condenser cooling air in a path isolated from the room to be cooled from and back to a space external to such room; a refrigerative circuit containing volatile refrigerant and including a condenser in heat exchanging relation with said condenser cooling air, a cooler of the surface type for liquid refrigerant mounted within the encircling wall of the blower housing and at least partially encircling said rotor, said cooler being distinct from said condenser, a vapor-arresting connection through which said condenser delivers liquid refrigerant to said cooler, an evaporator connected to be fed with liquid refrigerant from said cooler and means for withdrawing evaporated refrigerant from said evaporator and delivering it at higher pressure to said condenser; means for circulating air in heat exchanging relation with said evaporator and for delivering it to the room to be cooled; and means for collecting moisture condensed on said evaporator and for delivering it to the blower rotor whereby it is atomized and discharged directly against said cooler and caused to evaporate at least in part in heat exchanging relation with said cooler.

ALONZO W. RUFF.